United States Patent
Ushiro

(10) Patent No.: US 11,970,092 B2
(45) Date of Patent: Apr. 30, 2024

(54) IN-VEHICLE CONTROL APPARATUS, CONTROL PROGRAM, AND DEVICE CONTROL METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shota Ushiro, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 890 days.

(21) Appl. No.: 16/978,410

(22) PCT Filed: Feb. 26, 2019

(86) PCT No.: PCT/JP2019/007191
§ 371 (c)(1),
(2) Date: Sep. 4, 2020

(87) PCT Pub. No.: WO2019/172011
PCT Pub. Date: Sep. 12, 2019

(65) Prior Publication Data
US 2021/0046852 A1    Feb. 18, 2021

(30) Foreign Application Priority Data

Mar. 8, 2018 (JP) ................................ 2018-041808

(51) Int. Cl.
*B60N 2/14* (2006.01)
*B60N 2/00* (2006.01)
(Continued)

(52) U.S. Cl.
CPC ............. *B60N 2/143* (2013.01); *B60N 2/002* (2013.01); *B60N 2/0292* (2013.01);
(Continued)

(58) Field of Classification Search
CPC ...... B60N 2/143; B60N 2/002; B60N 2/0292; B60N 2/0272; B60N 2002/0212;
(Continued)

(56) References Cited

U.S. PATENT DOCUMENTS 10,252,693 B2 * 4/2019 Numazawa ....... B60R 21/23138
10,499,180 B1 * 12/2019 Harper ..................... H04R 5/02
(Continued)

FOREIGN PATENT DOCUMENTS

GB     2546632 A  *  7/2017  ............. B60N 99/00
JP   2013-133063 A     7/2013
(Continued)

OTHER PUBLICATIONS

Michael et al., ""Back-Seat Driver": Spatial Sound for Vehicular Way-Finding and Situation Awareness," 2006, Publisher: IEEE.*
(Continued)

*Primary Examiner* — Tuan C To
(74) *Attorney, Agent, or Firm* — Honigman LLP

(57) ABSTRACT

An in-vehicle control apparatus is to be mounted in a vehicle having a self-driving function and a driver's seat that can be turned backward, and includes a direction determination unit configured to determine a direction of the driver's seat, and a control unit configured to control an operation of a device mounted in the vehicle in accordance with the direction that is determined by the direction determination unit. In addition, an in-vehicle control apparatus according to the present embodiment is to be mounted in a vehicle having a self-driving function, and includes a self-driving determination unit configured to determine whether the vehicle is self-
(Continued)

driving, and a control unit configured to perform control for restricting an operation of a device mounted in the vehicle in accordance with a determination result of the self-driving determination unit.

13 Claims, 6 Drawing Sheets

(51) Int. Cl.
    *B60N 2/02*     (2006.01)
    *B60R 16/023*     (2006.01)
    *B60R 16/037*     (2006.01)
    *B60W 40/08*     (2012.01)

(52) U.S. Cl.
    CPC ........ *B60R 16/0231* (2013.01); *B60R 16/037* (2013.01); *B60W 40/08* (2013.01); *B60N 2002/0212* (2013.01); *B60N 2002/0216* (2013.01); *B60N 2/0272* (2023.08); *B60W 2040/0881* (2013.01)

(58) Field of Classification Search
    CPC ........ B60N 2002/0216; B60R 16/0231; B60R 16/037; B60W 40/08
    USPC .......................................................... 701/49
    See application file for complete search history.

(56) References Cited

U.S. PATENT DOCUMENTS

| | | | |
|---|---|---|---|
| 2006/0176370 A1* | 8/2006 | Chen | B60R 11/04 348/148 |
| 2006/0287826 A1* | 12/2006 | Shimizu | B60Q 9/007 701/431 |
| 2007/0003397 A1* | 1/2007 | Hirschman | B60R 11/00 414/462 |
| 2009/0136049 A1* | 5/2009 | Opfer | H04R 1/403 381/86 |
| 2010/0023234 A1* | 1/2010 | Kameyama | B60W 30/08 701/1 |
| 2015/0078954 A1 | 3/2015 | Bouzekri et al. | |
| 2015/0085117 A1* | 3/2015 | Chang | B60R 1/00 348/148 |
| 2016/0318442 A1* | 11/2016 | James | B60N 2/04 |
| 2016/0379631 A1* | 12/2016 | Wang | B60N 2/02246 704/275 |
| 2017/0028987 A1* | 2/2017 | Yamada | B60N 2/01 |
| 2017/0225593 A1 | 8/2017 | De Saulles | |
| 2017/0282792 A1* | 10/2017 | Illy | B60W 40/08 |
| 2017/0368936 A1* | 12/2017 | Kojima | B60W 40/08 |
| 2018/0012589 A1* | 1/2018 | MacNeille | G10K 11/17821 |
| 2018/0272977 A1* | 9/2018 | Szawarski | B60N 2/0244 |
| 2018/0326994 A1* | 11/2018 | Sakai | G05D 1/0061 |
| 2021/0300213 A1* | 9/2021 | Kobayashi | B60N 2/01 |

FOREIGN PATENT DOCUMENTS

| | | | | |
|---|---|---|---|---|
| JP | 2017-206120 A | 11/2017 | | |
| JP | 2017-210019 A | 11/2017 | | |
| WO | WO-2016109670 A1 * | 7/2016 | ........... | G01C 21/343 |
| WO | 2017-021066 A1 | 2/2017 | | |
| WO | 2017-072942 A1 | 5/2017 | | |
| WO | 2018-055852 A1 | 3/2018 | | |

OTHER PUBLICATIONS

International Search Report, Application No. PCT/JP2019/007191, dated May 14, 2019. ISA/Japan Patent Office.

* cited by examiner

FIG. 3

Function Restriction

| Function | Self-driving (First Restriction Mode) | Driver's Seat Backward (Second Restriction Mode) |
|---|---|---|
| Blinker Sound | Stop | Stop |
| Automatic Wiper | Normal Operation | Stop |
| Navigation Display | Reduce Brightness | Stop |
| Navigation guidance voice | Reduce Volume | Stop |
| Display (Driver's Seat) | Normal Operation | Stop |
| Electronic Mirror | Normal Operation | Stop |
| H U D | Normal Operation | Stop |
| Illumination (Driver's Seat) | Reduce Brightness | Stop |
| Air Conditioner | Normal Operation | Adjust Airflow Direction |
| Meter | Reduce Brightness | Stop |

IN-VEHICLE CONTROL APPARATUS, CONTROL PROGRAM, AND DEVICE CONTROL METHOD

CROSS-REFERENCE TO RELATED APPLICATIONS

This application is the U.S. national stage of PCT/JP2019/007191 filed on Feb. 26, 2019, which claims priority of Japanese Patent Application No. JP 2018-041808 filed on Mar. 8, 2018, the contents of which are incorporated herein.

TECHNICAL FIELD

The present disclosure relates to an in-vehicle control apparatus, a control program, and a device control method that control a device mounted in a vehicle having a self-driving function.

BACKGROUND

JP 2013-133063A proposes a control apparatus of an idle stop vehicle which stops an engine for a time period from when a prescribed stop condition is satisfied during driving of an engine to when a prescribed restart condition is satisfied, the control apparatus suppressing an operation sound of a direction indicator when the idle stop is performed during operation of a direction indicator lamp, and cancelling suppression of the operation sound when the vehicle returns from the idle stop.

In recent years, techniques for controlling automobiles have dramatically progressed, and not only the above-described idle stop control but also self-driving of automobiles has been realized. When self-driving is realized, the occupants are released from the driving operation, and therefore comfort of a vehicle interior during travelling of the automobile is further demanded.

The present disclosure has been made in view of the above circumstances, and an object of the present disclosure is to provide an in-vehicle control apparatus, a control program, and a device control method with which improvement of the comfort of the vehicle interior during self-driving can be expected.

SUMMARY

An in-vehicle control apparatus according to one aspect is to be mounted in a vehicle having a self-driving function and a driver's seat that can be turned backward, the in-vehicle control apparatus including a direction determination unit configured to determine a direction of the driver's seat, and a control unit configured to control an operation of a device mounted in the vehicle in accordance with the direction that is determined by the direction determination unit.

An in-vehicle control apparatus according to one aspect is to be mounted in a vehicle having a self-driving function, the in-vehicle control apparatus including a self-driving determination unit configured to determine whether the vehicle is self-driving, and a control unit configured to perform control for restricting an operation of a device mounted in the vehicle in accordance with a determination result of the self-driving determination unit.

A control program according to one aspect causes an in-vehicle control apparatus that is mounted in a vehicle having a self-driving function and a driver's seat that can be turned backward to execute processing for determining a direction of the driver's seat, and controlling an operation of a device mounted in the vehicle in accordance with the determined direction.

A control program according to one aspect causes an in-vehicle control apparatus that is mounted in a vehicle having a self-driving function to execute processing for determining whether the vehicle is self-driving, and restricting an operation of a device mounted in the vehicle in accordance with a determination result.

A device control method according to one aspect is a device control method in a vehicle having a self-driving function and a driver's seat that can be turned backward, the method including determining a direction of the driver's seat, and controlling an operation of a device mounted in the vehicle in accordance with a determined direction.

A device control method according to one aspect is a device control method in a vehicle having a self-driving function, the method including determining whether the vehicle is self-driving, and restricting an operation of a device mounted in the vehicle in accordance with a determination result.

Note that, the present application can be realized not only as an in-vehicle control apparatus having such a characteristic processing unit, but also as a device control method including the characteristic processing as steps, a control program for causing a computer to execute the steps, and so on. Furthermore, the in-vehicle control apparatus can be realized as a semiconductor integrated circuit that realizes the in-vehicle control apparatus as a whole or in part, as another apparatus or a system including the in-vehicle control apparatus, and so on.

Advantageous Effects of Disclosure

According to the above, it can be expected that the comfort of the vehicle interior during self-driving will be improved.

BRIEF DESCRIPTION OF DRAWINGS

FIG. 3 is a schematic diagram illustrating an example of function restriction processing.

DETAILED DESCRIPTION OF PREFERRED EMBODIMENTS

Figure 1:
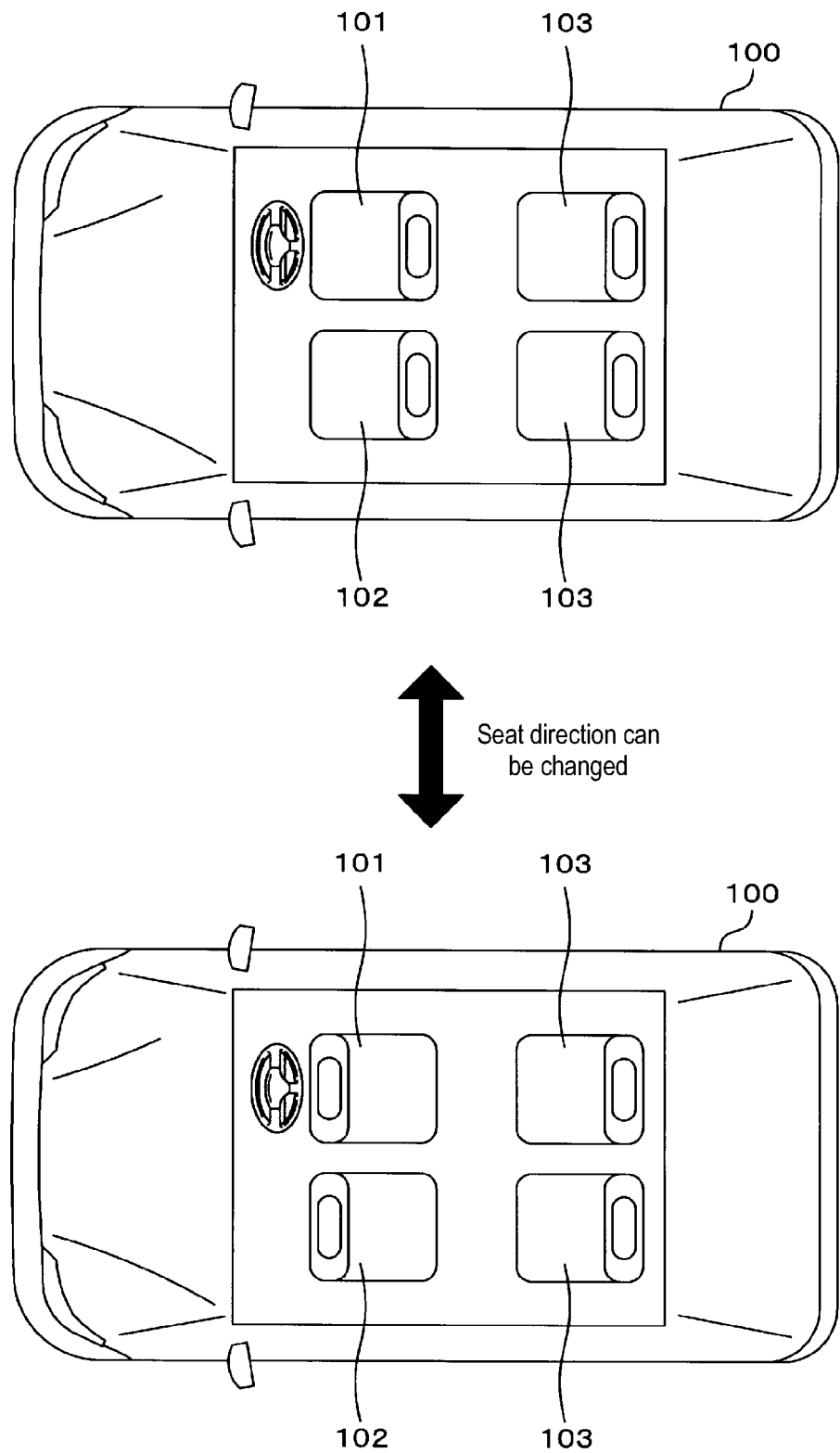
FIG. 1 is a schematic diagram illustrating an overview of a vehicle in which an in-vehicle control apparatus according to an embodiment is mounted.

First, aspects of the present disclosure will be listed and described. At least portions of the embodiments described hereinafter may be combined as appropriate.

The in-vehicle control apparatus according to this aspect is to be mounted in a vehicle having a self-driving function and a driver's seat that can be turned backward, the in-vehicle control apparatus including a direction determination unit configured to determine a direction of the driver's seat, and a control unit configured to control an operation of a device mounted in the vehicle in accordance with the direction that is determined by the direction determination unit.

In this aspect, the vehicle is provided with the self-driving function. The driver's seat of the vehicle is configured such that the occupants can turn the direction of the driver's seat at least backward. When the driver's seat faces backward, since the driver cannot drive the vehicle, it is possible to infer that the vehicle is self-driving. As such, the in-vehicle control apparatus determines the direction of the driver's seat, and controls the operations of devices mounted in the vehicle in accordance with the determined direction. In this manner, it is possible to infer whether the vehicle is self-driving based on the direction of the driver's seat, and operate the devices giving priority to improvement of the comfort of the vehicle interior during self-driving.

It is preferable that the in-vehicle control apparatus further includes a self-driving determination unit configured to determine whether the vehicle is self-driving, and the control unit controls the operation of the device in accordance with a determination result of the self-driving determination unit, and the direction determined by the direction determination unit.

In this aspect, the in-vehicle control apparatus further determines whether the vehicle is self-driving. The in-vehicle control apparatus controls the operations of devices in accordance with whether the vehicle is self-driving and the direction of the driver's seat. Accordingly, the in-vehicle control apparatus can reliably determine whether the vehicle is self-driving, and control the devices, and can further perform control of the devices that is suitable for the situation of the vehicle interior during self-driving, according to the direction of the driver's seat.

It is preferable that the control unit operates the device in a first operation state when the self-driving determination unit determines that the vehicle is self-driving and the direction determined by the direction determination unit is forward, and the control unit operates the device in a second operation state when the self-driving determination unit determines that the vehicle is self-driving and the direction determined by the direction determination unit is backward.

In this aspect, the device is operated in the first operation state when the vehicle is self-driving and the driver's seat faces forward, and the device is operated in the second operation state when the vehicle is self-driving and the driver's seat faces backward. In this manner, when the vehicle is self-driving, the in-vehicle control apparatus can perform control of the device that is more suitable for the situation of the vehicle interior that is inferred from the direction of the driver's seat.

It is preferable that the control unit restricts the operation of the device when the direction of the driver's seat determined by the direction determination unit is backward.

In this aspect, the in-vehicle control apparatus restricts the operations of devices when the driver's seat faces backward. In this manner, it is possible to restrict the operations of devices that are not necessary for the driver during self-driving, and improve the comfort of the vehicle interior. Furthermore, by restricting the operations of devices, it is possible to reduce the amount of power consumption of the devices.

An in-vehicle control apparatus according to this aspect is to be mounted in a vehicle having a self-driving function, the in-vehicle control apparatus including a self-driving determination unit configured to determine whether the vehicle is self-driving, and a control unit configured to perform control for restricting an operation of a device mounted in the vehicle in accordance with a determination result of the self-driving determination unit.

In this aspect, the vehicle is provided with the self-driving function. The in-vehicle control apparatus determines whether the vehicle is self-driving, and restricts the operations of devices mounted in the vehicle according to the determination result. In this manner, it is possible to restrict the operations of devices that are not necessary for the driver during self-driving, and improve the comfort of the vehicle interior.

It is preferable that the device is a direction indicator, and the control unit performs control for reducing an operation sound of the direction indicator.

In this aspect, the in-vehicle control apparatus controls the operation of the direction indicator of the vehicle, and reduces the operation sound of the direction indicator. In this manner, it is possible to reduce the operation sound of the direction indicator that is not necessary during self-driving, prevent a case where the operation sound of the direction indicator annoys the occupants in the vehicle interior, interferes with a conversation between the occupants, and the like, and to improve the comfort of the vehicle interior.

It is preferable that the device is a wiper, and the control unit performs control for stopping an automatic operation of the wiper that is performed according to rainfall.

In this aspect, the in-vehicle control apparatus controls the operation of the wiper of the vehicle, and stops an automatic operation of the wiper that is performed according to rainfall, namely, a so-called automatic wiper. Accordingly, it is possible to stop an operation of the wiper that is not necessary during self-driving, and prevent a case where the operating wiper comes into the occupants' field of view, the operation sound of the wiper annoys the occupants, or the like, and to improve the comfort of the vehicle interior.

It is preferable that the device is a display device, and the control unit performs control for reducing a brightness of a screen display of the display device.

In this aspect, the in-vehicle control apparatus controls the operation of the display device of the vehicle and reduces the brightness of the screen display of the display device (including control for turning off the screen display). During self-driving, the occupants does not need the screen display of the display device displaying information necessary for driving, and such a screen display may bother the occupants. In view of this, by the in-vehicle control apparatus reducing the brightness of the screen display of the display device, it is possible to improve the comfort of the vehicle interior during self-driving.

It is preferable that the device is a car navigation device, and the control unit performs control for reducing a volume of a guidance voice of the car navigation device.

In this aspect, the in-vehicle control apparatus controls the operation of the car navigation device of the vehicle and reduces the volume of the guidance voice of the car navigation device (including control for turning off the guidance voice). During self-driving, the guidance of the car navigation device is not necessary, and the guidance voice may bother the occupants. In view of this, by the in-vehicle control apparatus reducing the volume of the guidance voice of the car navigation device, it is possible to improve the comfort of the vehicle interior during self-driving.

A control program according to this aspect causes an in-vehicle control apparatus that is mounted in a vehicle having a self-driving function and a driver's seat that can be turned backward to execute processing for determining a direction of the driver's seat, and controlling an operation of a device mounted in the vehicle in accordance with the determined direction.

In this aspect, similarly to the aspect (1), it is possible to perform the operations of devices giving priority to improvement of the comfort of the vehicle interior during self-driving.

A control program according to this aspect causes an in-vehicle control apparatus that is mounted in a vehicle having a self-driving function to execute processing for determining whether the vehicle is self-driving, and restricting an operation of a device mounted in the vehicle in accordance with a determination result.

In this aspect, similarly to the aspect (5), it is possible to restrict the operations of devices that are not necessary for the driver during self-driving, and improve the comfort of the vehicle interior.

A device control method according to this aspect is a device control method in a vehicle having a self-driving function and a driver's seat that can be turned backward, the method including determining a direction of the driver's seat, and controlling an operation of a device mounted in the vehicle in accordance with a determined direction.

In this aspect, similarly to the aspect (1), it is possible to perform the operations of devices giving priority to improvement of the comfort of the vehicle interior during self-driving.

A device control method according to this aspect is a device control method in a vehicle having a self-driving function, the method including determining whether the vehicle is self-driving, and restricting an operation of a device mounted in the vehicle in accordance with a determination result.

In this aspect, similarly to the aspect (5), it is possible to restrict the operations of devices that are not necessary for the driver during self-driving, and improve the comfort of the vehicle interior.

Hereinafter, specific examples of a communication system according to the embodiments of the present disclosure will be described with reference to the drawings. Note that the present disclosure is not limited to these examples, and is defined by the claims, and all changes within the meaning and range of equivalency of the claims are intended to be embraced therein.

Apparatus Configuration

FIG. 1 is a schematic diagram illustrating an overview of a vehicle in which an in-vehicle control apparatus according to the present embodiment is mounted. In the present embodiment, a vehicle 100 is provided with a self-driving function. The self-driving function provided to the vehicle 100 is assumed to be a function with which, for example, by a driver setting a destination, the vehicle 100 thereafter automatically travels to the destination without the driver operating a wheel (steering wheel), an accelerator, a brake, or the like.

The vehicle 100 shown in FIG. 1 includes a driver's seat 101 provided on the front right side in the vehicle interior, a passenger seat 102 provided on the front left side, and backseats 103 provided on the rear side. In the vehicle 100 according to the present embodiment, the directions of the driver's seat 101 and the passenger seat 102 can be changed. A configuration may be employed in which the directions of the driver's seat 101 and the passenger seat 102 are changed by, for example, rotating the seats by 180° or 360°, or by moving the backrest of the seats so that the seats face forward or backward, or the directions are changed by a method other than that. In the present embodiment, while any method for changing the directions of the driver's seat 101 and the passenger seat 102 can be adopted, it is assumed that the directions of the driver's seat 101 and the passenger seat 102 can be changed to at least two patterns, namely, forward and backward.

By operating the self-driving function of the vehicle 100, the driver of the vehicle 100 can change the direction of the driver's seat 101 to backward, enjoy a face-to-face conversation and the like with occupants sitting on the backseats 103 even when the vehicle 100 is traveling. Various kinds of information the vehicle 100 feeds back to the driver when the driver manually drives the vehicle 100 may not be necessary for the driver during self-driving of the vehicle 100. In view of this, in the present embodiment, the in-vehicle control apparatus mounted in the vehicle 100 performs control to restrict the operations of in-vehicle devices that affect the occupant sitting on the driver's seat 101 of the vehicle 100 during self-driving of the vehicle 100.

Figure 2:
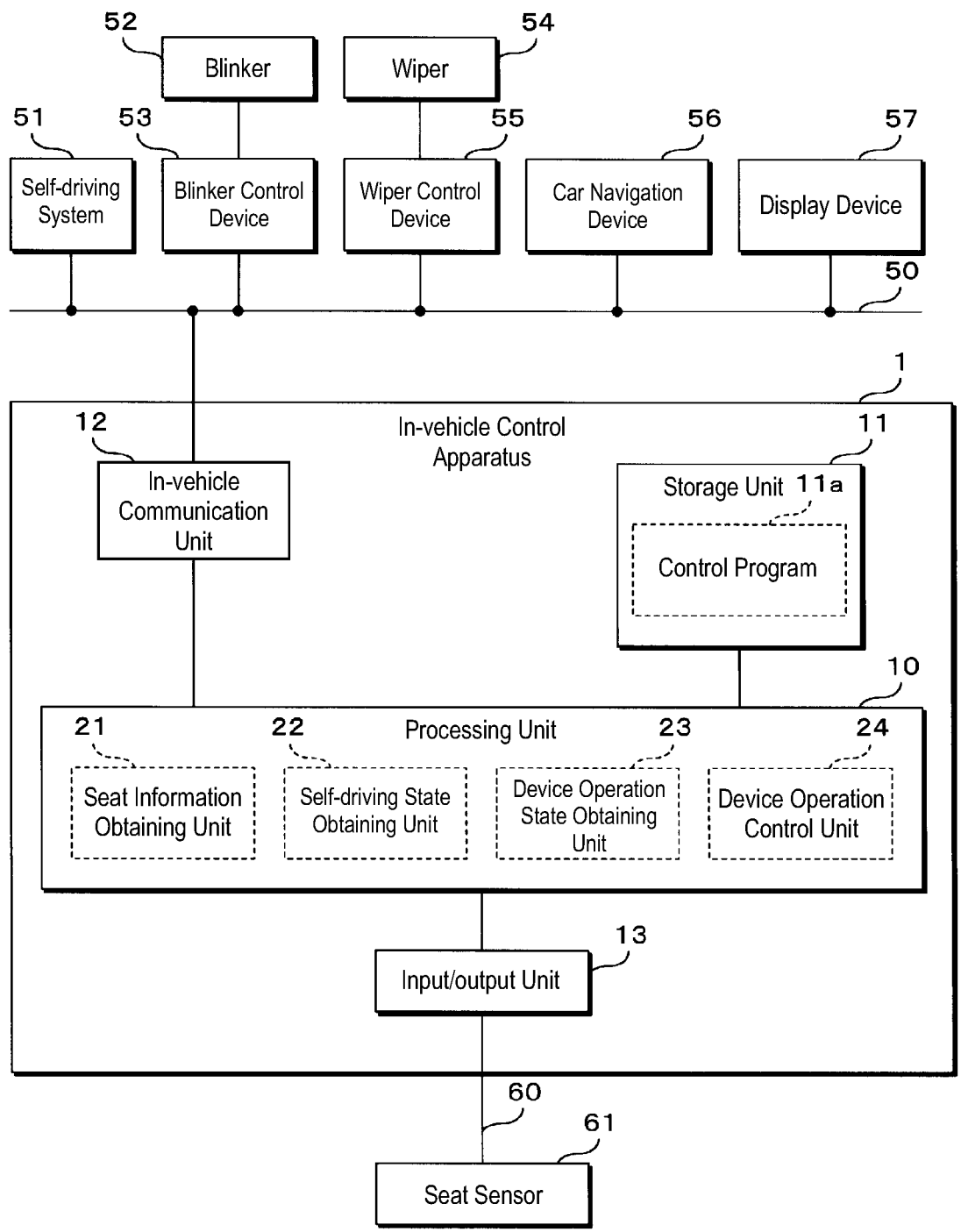
FIG. 2 is a block diagram illustrating a configuration of the in-vehicle control apparatus according to the embodiment.

FIG. 2 is a block diagram showing a configuration of the in-vehicle control apparatus according to the present embodiment. The in-vehicle control apparatus 1 according to the present embodiment is mounted in the above-described vehicle 100 provided with the self-driving function and the driver's seat 101 that can change direction. The in-vehicle control apparatus 1 may be mounted in the vehicle 100 as a stand-alone ECU (Electronic Control Unit), for example, or realized as one function of a device such as an ECU or a gateway mounted in the vehicle 100, for example.

The in-vehicle control apparatus 1 is constituted to include a processing unit (processor) 10, a storage unit (storage) 11, an in-vehicle communication unit (transceiver) 12, and an input/output unit (interface) 13, and the like. The processing unit 10 is constituted using a computation processing device such as a CPU (Central Processing Unit), an MPU (Micro-Processing Unit), or the like, and can execute various types of processing by executing a control program 11a stored in the storage unit 11. In the present embodiment, the processing unit 10 executes processing for controlling the operations of various kinds of in-vehicle devices mounted in the vehicle 100 according to the self-driving state of the vehicle 100 and the direction of the driver's seat 101, by reading out and executing the control program 11a stored in the storage unit 11.

The storage unit 11 is constituted by using a nonvolatile memory device such as a flash memory or an EEPROM (Electrically Erasable Programmable Read Only Memory). The storage unit 11 stores various kinds of programs executed by the processing unit 10, and various kinds of data that are necessary for processing performed by the processing unit 10. In the present embodiment, the storage unit 11 stores the control program 11a executed by the processing unit 10. Note that the control program 11a may, for example, be written into the storage unit 11 at the manufacturing stage of the in-vehicle control apparatus 1, may, for example, be distributed by a remote server apparatus or the like and obtained by the in-vehicle control apparatus 1 through communication, may, for example, be recorded in a recording medium such as a memory card or an optical disk and read out by the in-vehicle control apparatus 1 and stored in the storage unit 11, or may, for example, be recorded in a recording medium and read out by a writing device and written in the storage unit 11 of the in-vehicle control apparatus 1. The control program 11a may be provided in a form distributed via a network, or provided in a form recorded in a recording medium.

The in-vehicle communication unit 12 exchanges messages with various in-vehicle devices mounted in the vehicle 100 via an in-vehicle network 50 provided in the vehicle 100. Note that in the example shown in the figure, the in-vehicle network 50 is a network having a bus configuration, but the configuration is not limited to this, and various types of network configuration such as star or ring configuration can be adopted. The in-vehicle communication unit 12 exchanges messages compliant with a communication protocol such as CAN (Controller Area Network) or Ethernet (registered trademark). The in-vehicle communication unit 12 can transmit a message by outputting digital data supplied as a message sent from the processing unit 10 to a communication line constituting the in-vehicle network 50 as an electric signal. Furthermore, the in-vehicle communication unit 12 samples and obtains a potential of the communication line constituting the in-vehicle network 50, and provides digital data obtained as a result of the sampling to the processing unit 10 as a received message. The in-vehicle communication unit 12 may be constituted by using an IC (Integrated Circuit) that performs communication compliant with a communication protocol such as CAN or Ethernet.

In the example shown in the FIG. 2, the in-vehicle control apparatus 1 is connected to a self-driving system 51, a blinker control device 53, a wiper control device 55, a car navigation device 56 and a display device 57 via the in-vehicle network 50, and exchanges messages with these in-vehicle devices. Note that the in-vehicle devices with which the in-vehicle control apparatus 1 communicates via the in-vehicle network 50 are not limited to those shown in the FIG. 2. The self-driving system 51 is a system for realizing the self-driving function of the vehicle 100. Although the self-driving system 51 is shown as one functional block in FIG. 2, in reality, the self-driving system 51 may be implemented by a plurality of apparatuses cooperating with each other. In the present embodiment, the detail of the self-driving system 51 of the vehicle 100 will not be described.

The blinker control device 53 controls the operation of the blinker (direction indicator) 52 mounted in the vehicle 100. A blinker 52 is a lamp that notifies the surrounding vehicles that the vehicle 100 will turn to the left or right. The blinker control device 53 controls turning on/off of the blinker 52, outputs the operation sound of the blinker 52, and adjusts the volume of the operation sound of the blinker. The operation sound of the blinker 52 is output to notify the driver of the vehicle 100 that the blinker 52 is operating.

The wiper control device 55 controls the operation of a wiper 54 mounted at least on the windshield of the vehicle 100. The wiper 54 is a device that removes raindrops attached on the windshield at the time of rainfall, and by removing the raindrops, the field of view of the driver of the vehicle 100 is ensured. The wiper control device 55 operates the wiper 54 according to a user operation, and controls a so-called automatic wiper that automatically operates the wiper 54 at the time of rainfall based on information from a raindrop sensor or the like (not shown).

The car navigation device 56 is provided to a dashboard or an instrument panel of the vehicle 100, for example, accepts a destination setting input by the driver of the vehicle 100, calculates the route from the present location to the destination, displays the route to the destination, outputs a guidance voice, and so on. Note that the car navigation device 56 may be included in the self-driving system 51, however, in the present embodiment, the car navigation device 56 is shown as a separate device. The display device 57 is a device that is provided near the driver's seat of the vehicle 100, and displays information necessary for driving of the vehicle 100. The information displayed by the display device 57 may include the speed, driving distance, and the remaining amount of the fuel of the vehicle 100, as well as time, temperature, and the like. Note that the display device 57 may also be used as a display of the car navigation device 56.

Various devices mounted in the vehicle 100 are connected to the input/output unit 13 of the in-vehicle control apparatus 1 via signal lines, communication lines, or the like. The input/output unit 13 obtains signals input from these devices connected thereto, and supplies the signals to the processing unit 10 as digital input data. The input/output unit 13 also converts output data supplied from the processing unit 10 into a signal suitable for output destination devices as appropriate, and outputs the signal to the output destination devices. The input/output unit 13 may be constituted by using, for example, an A/D conversion circuit that converts input analog signals into digital signals by sampling and obtaining the analog signals, a D/A conversion circuit that converts digital signals into analog signals and outputs the resultant analog signals, a driver circuit, a communication circuit that transmits and receives digital data, or the like.

In the present embodiment, a seat sensor 61 is connected to the input/output unit 13 via a signal line 60. The seat sensor 61 is a sensor that detects the direction of the driver's seat 101 of the vehicle 100, and inputs a signal indicating the detected direction of the driver's seat 101 to the in-vehicle control apparatus 1. The seat sensor 61 may have a configuration that detects the direction of the driver's seat 101 with a mechanical switch, may be an optical sensor, or may have a configuration that detects the direction of the driver's seat 101 with a configuration other than these, for example. In the present embodiment, any method can be used for detecting the direction of the driver's seat 101 with the seat sensor 61, however, the method is assumed to be capable of detecting at least whether the driver's seat 101 faces backward.

Furthermore, in the in-vehicle control apparatus 1 according to the present embodiment, a seat information obtaining unit 21, a self-driving state obtaining unit 22, a device operation state obtaining unit 23, a device operation control unit 24, and the like are realized as software-based functional blocks by the processing unit 10 reading out and executing the control program 11a stored in the storage unit 11. The seat information obtaining unit 21 performs processing for obtaining information regarding the direction of the driver's seat 101 of the vehicle 100 by obtaining a signal input from the seat sensor 61 to the input/output unit 13. The seat information obtaining unit 21 determines whether the driver's seat 101 faces backward based on the obtained information.

The self-driving state obtaining unit 22 performs processing for obtaining state information regarding whether the vehicle 100 is self-driving by performing communication with the self-driving system 51 through the in-vehicle communication unit 12. The self-driving state obtaining unit 22 generates a message inquiring about the state of the self-driving of the vehicle 100, for example, and transmits the generated inquiry message from the in-vehicle communication unit 12 to the self-driving system 51. The self-driving state obtaining unit 22 receives a response message transmitted from the self-driving system 51 in response to this inquiry message in the in-vehicle communication unit 12, and determines whether self-driving is being performed based on information included in the received response message.

The device operation state obtaining unit 23 performs processing for obtaining the operation states of various kinds of in-vehicle devices mounted in the vehicle 100. In the present embodiment, the device operation state obtaining unit 23 obtains the operation state of the blinker 52, the wiper 54, the car navigation device 56, or the display device 57 of the vehicle 100 by performing communication with the blinker control device 53, the wiper control device 55, the car navigation device 56, or the display device 57 through the in-vehicle communication unit 12. The device operation state obtaining unit 23 generates a message for inquiring about the operation state of these devices mounted in the vehicle 100, for example, and transmits the generated inquiry message from the in-vehicle communication unit 12 to the target device. The device operation state obtaining unit 23 receives a response message to the inquiry message through the in-vehicle communication unit 12, and can determine the operation state of each device based on information included in the received response message.

The device operation control unit 24 performs processing for controlling the operations of various kinds of in-vehicle devices mounted in the vehicle 100. In the present embodiment, the device operation control unit 24 controls the operation of the blinker 52, the wiper 54, the car navigation device 56, or the display device 57 of the vehicle 100 by performing communication with the blinker control device 53, the wiper control device 55, the car navigation device 56, or the display device 57 through the in-vehicle communication unit 12, and transmitting the message including an operation instruction. In particular, the device operation control unit 24 according to the present embodiment performs processing for restricting the operations of the in-vehicle devices mounted in the vehicle 100 in accordance with the direction of the driver's seat 101 obtained by the seat information obtaining unit 21 and the self-driving state obtained by the self-driving state obtaining unit 22.

Operation Restriction Processing

Hereinafter, details of processing for restricting the operations of the in-vehicle devices performed by the in-vehicle control apparatus 1 according to the present embodiment will be described. FIG. 3 is a schematic diagram illustrating an example of the processing for restricting the functions. FIG. 3 is a table illustrating an example of a correspondence relationship the functions (devices) to be restricted have with restrictions applied when the vehicle 100 is self-driving and restrictions applied when self-driving is being performed and the driver's seat 101 faces backward. FIG. 3 also illustrates several examples of function restrictions with regard to in-vehicle devices other than the blinker 52, the wiper 54, the car navigation device 56, and the display device 57 that are shown in FIG. 2.

The in-vehicle control apparatus 1 according to the present embodiment switches the operations of the in-vehicle devices between three modes, namely, a non-restriction mode in which various kinds of in-vehicle devices mounted in the vehicle 100 operate without functional restriction, a first restriction mode in which the operations of the in-vehicle devices are restricted when self-driving of the vehicle 100 is being performed and the driver's seat 101 faces forward, and a second restriction mode in which the operations of the in-vehicle devices are restricted when self-driving of the vehicle 100 is being performed and the driver's seat 101 faces backward. FIG. 3 describes the operations of the in-vehicle devices in the first restriction mode and the second restriction mode, and the operations of the in-vehicle devices in the non-restriction mode are not described.

In the vehicle 100 according to the present embodiment, sound accompanying the operation of the blinker 52, in other words, a blinker sound that clicks in synchronization with the blinking of the blinker 52, is generated by the blinker control device 53 and output from a speaker in the vehicle interior or the like. In the first restriction mode and the second restriction mode, the in-vehicle control apparatus 1 restricts the output of the blinker sound that is output by the blinker control device 53. When the in-vehicle control apparatus 1 applies the restriction, the blinker control device 53 stops the output of the blinker sound. Note that, the blinker control device 53 does not stop the blinking of the lamp of the blinker 52. Note that although, in FIG. 3, an example in which the blinker sound is stopped both in the first restriction mode and the second restriction mode is described, there is no limitation to this example, and a configuration may be used in which, for example, the volume of the blinker sound is reduced in the first restriction mode and the output of the blinker sound is stopped in the second restriction mode.

Furthermore, in the second restriction mode, the in-vehicle control apparatus 1 restricts the auto wiper function of the wiper 54 of the vehicle 100. However, with respect to the wiper 54, in the first restriction mode, the in-vehicle control apparatus 1 performs the normal operation of the automatic wiper function that automatically operates the wiper 54 in response to the detection of raindrops, rather than restricting the automatic wiper function. When the in-vehicle control apparatus 1 applies the restriction, the wiper control device 55 stops the automatic wiper function and does not automatically operate the wiper 54 even when raindrops are detected.

Also, the in-vehicle control apparatus 1 applies the restriction for reducing the brightness of the guidance screen display (navigation display) of the car navigation device 56 in the first restriction mode, and applies the restriction for stopping the guiding screen display in the second restriction mode. When the in-vehicle control apparatus 1 applies the restriction, the car navigation device 56 reduces the brightness of the guiding screen display or stops the guiding screen display (does not perform screen display).

Similarly, the in-vehicle control apparatus 1 applies the restriction for reducing the output volume of the guidance voice (navigation guidance voice) of the car navigation device 56 in the first restriction mode, and performs control for stopping the output of the guidance voice in the second restriction mode. When the in-vehicle control apparatus 1 applies the restriction, the car navigation device 56 reduces the output volume of the guidance voice or stops the output of the guidance voice (does not output the guidance voice).

Furthermore, in the second restriction mode, the in-vehicle control apparatus 1 restricts the display of the display device 57 provided near the driver's seat of the vehicle 100. Note that, in the first restriction mode, the in-vehicle control apparatus 1 causes the display device 57 to perform the screen display in the normal operation rather than restricting the display by the display device 57. When the in-vehicle control apparatus 1 applies the restriction, the display device 57 stops the screen display (does not perform the screen display).

In the case where a rearview mirror or a side mirror of the vehicle 100 is an electronic mirror using a camera for shooting the outside of the vehicle and a display for displaying the images shot by this camera, the in-vehicle control apparatus 1 may restrict the display of the electronic mirror. For example, the in-vehicle control apparatus 1 restricts the display of the electronic mirror in the second restriction mode, and causes the electronic mirror to perform display in the normal operation rather than applying the restriction in the first restriction mode. When the in-vehicle control apparatus 1 applies the restriction, the electronic mirror stops display (does not perform the display).

When a HUD (Head Up Display) is mounted in the vehicle 100, the in-vehicle control apparatus 1 may restrict the display of the HUD. The HUD may be configured to display information on the windshield of the vehicle 100, for example. For example, the in-vehicle control apparatus 1 restricts the display of the HUD in the second restriction mode, and causes the HUD to perform display in the normal operation rather than applying the restriction in the first restriction mode. When the in-vehicle control apparatus 1 applies the restriction, the HUD stops the display (does not perform the display).

If an illumination lamp is installed in the interior of the vehicle 100, the in-vehicle control apparatus 1 may restrict the lighting of the illumination lamp provided near the driver's seat of the vehicle 100. For example, the in-vehicle control apparatus 1 applies the restriction for reducing the brightness of the illumination lamp in the first restriction mode, and turns off the illumination lamp in the second restriction mode. When the in-vehicle control apparatus 1 applies the restriction, the illumination lamp reduces the brightness of the lamp, or turns off the lamp (does not light the lamp).

Furthermore, the in-vehicle control apparatus 1 may restrict the operation of an air conditioner (A/C) of the vehicle 100. For example, in the second restriction mode, the in-vehicle control apparatus 1 may adjust the airflow direction so that the air blowing from the front side in the interior of the vehicle 100 to the driver's seat is stopped, and the air is blown from another location of the vehicle interior to the driver's seat.

Furthermore, when the various kinds of meters provided forward of the driver's seat of the vehicle 100 are a type of meter that is displayed on the display, the in-vehicle control apparatus 1 may restrict the display, and when the meters are a mechanical type of meter, the in-vehicle control apparatus 1 may restrict the lighting of the backlight of the meters. For example, the in-vehicle control apparatus 1 applies the restriction for reducing the brightness of the display or the backlight of the meters in the first restriction mode, and applies the restriction for stopping the display or the backlight of the meters in the second restriction mode.

In this manner, when the vehicle 100 is self-driving and the driver's seat 101 faces forward, the in-vehicle control apparatus 1 according to the present embodiment applies predetermined restrictions on the operations of the in-vehicle devices as the first restriction mode. Since the driver's seat 101 of the vehicle 100 faces forward and the driver faces forward in the first restriction mode, the in-vehicle control apparatus 1 according to the present embodiment partially restricts the functions such as reducing the brightness and volume, rather than completely restricting the operations of the various devices mounted in the vehicle 100. In the first restriction mode, the functions of some devices are not restricted and the normal operations thereof are maintained.

When the vehicle 100 is self-driving and the driver's seat 101 faces backward, the in-vehicle control apparatus 1 applies predetermined restrictions on the operations of the in-vehicle devices as the second restriction mode. In the situation where the driver's seat 101 of the vehicle 100 faces backward and the driver faces backward, it is conceivable that the driver is not driving the vehicle 100 and information regarding driving is not being used. In view of this, in the second restriction mode, the in-vehicle control apparatus 1 restricts (stops) the operations of the devices that provide information necessary for the driver among the various kind of devices mounted in the vehicle 100.

Flowchart

Figure 4:
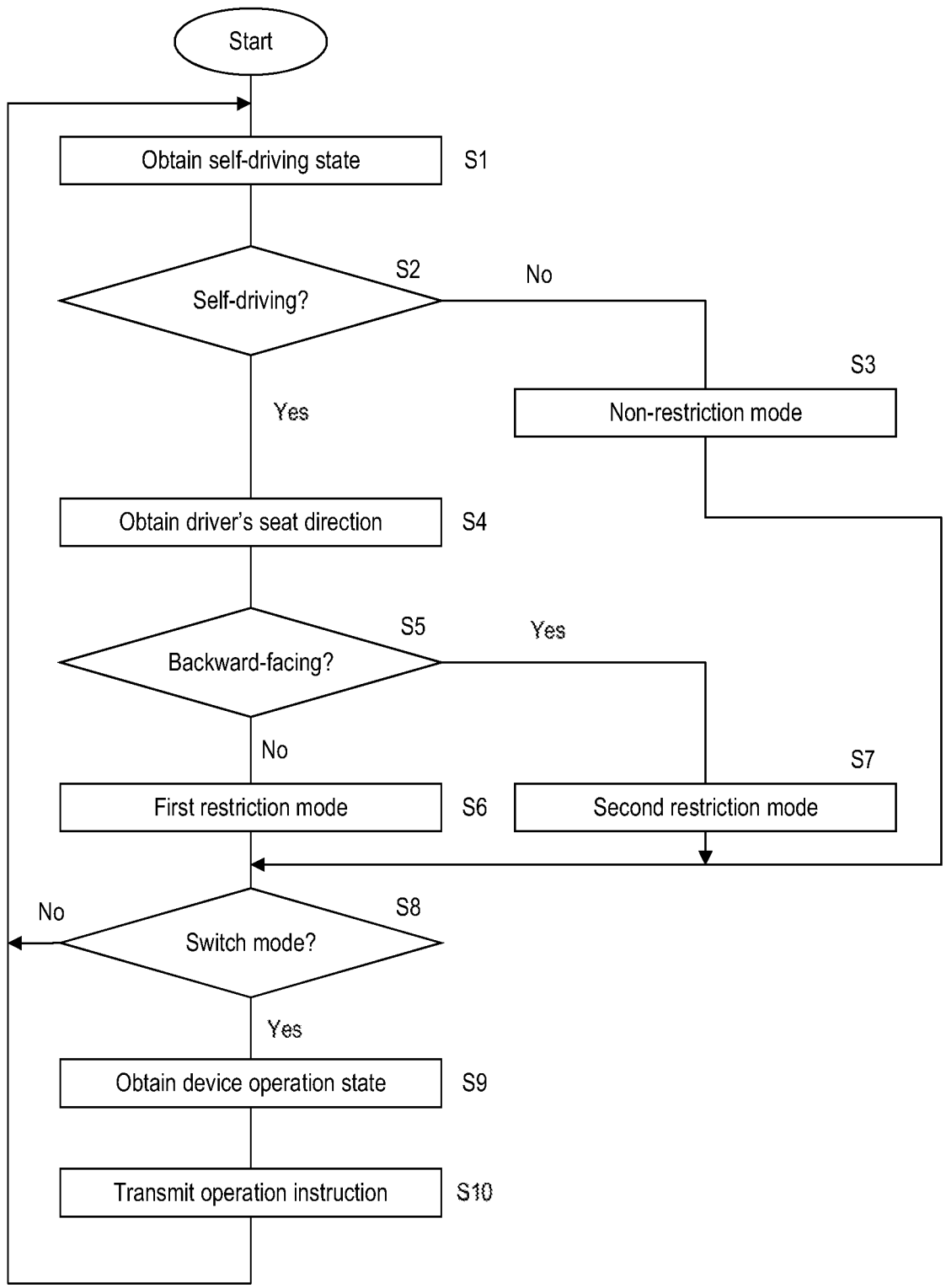
FIG. 4 is a flowchart illustrating procedures of operation restriction processing performed by the in-vehicle control apparatus according to the embodiment.

FIG. 4 is a flowchart showing the procedures of operation restriction processing performed by the in-vehicle control apparatus 1 according to the present embodiment. The self-driving state obtaining unit 22 of the processing unit 10 of the in-vehicle control apparatus 1 according to the present embodiment obtains information regarding the self-driving state of the vehicle 100 by communicating with the self-driving system 51 via the in-vehicle network 50 through the in-vehicle communication unit 12 (step S1). The self-driving state obtaining unit 22 determines whether the vehicle 100 is self-driving, based on the obtained self-driving state (step S2). If self-driving is not being performed (S2: NO), the device operation control unit 24 of the processing unit 10 determines to operate various kinds of devices mounted in the vehicle 100 in the non-restriction mode (step S3), and advances the processing to step S8.

If self-driving is being performed (S2: YES), the seat information obtaining unit 21 of the processing unit 10 obtains the direction of the driver's seat 101 of the vehicle 100 by obtaining information input from the seat sensor 61 to the input/output unit 13 (step S4). The seat information obtaining unit 21 determines whether the driver's seat 101 faces backward based on the obtained information (step S5). If the driver's seat 101 does not face backward (S5: NO), the device operation control unit 24 of the processing unit 10 determines to operate the various kinds of devices mounted in the vehicle 100 in the first restriction mode (step S6), and advances the processing to step S8. If the driver's seat 101 faces backward (S5: YES), the device operation control unit 24 determines to operate the various kinds of devices mounted in the vehicle 100 in the second restriction mode (step S7), and advances the processing to step S8.

Upon determining the mode regarding the control of the devices, the device operation control unit 24 determines whether the mode needs to be switched in accordance with whether the mode determined this time is different from the previous mode (step S8). If the mode does not need to be switched (S8: NO), the processing unit 10 returns the processing to step S1. If the mode needs to be switched (S8: YES), the device operation state obtaining unit 23 of the processing unit 10 performs communication with the devices to be controlled through the in-vehicle communication unit 12 and obtains the operation state of the devices (step S9). The device operation control unit 24 transmits the operation instructions to the devices to change the operations of the devices to that appropriate in the determined mode based on the obtained operation state (step S10), and returns the processing to step S1.

SUMMARY

The in-vehicle control apparatus 1 according to the present embodiment described above is mounted in the vehicle 100 that is provided with the self-driving system 51 that realizes the self-driving function and the driver's seat 101 that can be turned backward. The in-vehicle control apparatus 1 controls the operations of the devices mounted in the vehicle 100 in accordance with whether the vehicle 100 is self-driving and the direction of the driver's seat 101. Accordingly, the in-vehicle control apparatus 1 can perform control of the devices that is suitable for the situation of the interior of the vehicle 100 during self-driving.

Furthermore, the in-vehicle control apparatus 1 operates the devices in the first restriction mode when the vehicle 100 is self-driving and the driver's seat 101 faces forward, and operates the devices in the second restriction mode when the vehicle 100 is self-driving and the driver's seat 101 faces backward. Accordingly, when the vehicle 100 is self-driving, the in-vehicle control apparatus 1 can perform control of the device that is more suitable for the situation of the vehicle interior that is inferred from the direction of the driver's seat 101.

Furthermore, the in-vehicle control apparatus 1 performs control for restricting the operations of devices mounted in the vehicle 100. Accordingly, it is possible to restrict the operations of the devices that are not necessary for the driver during self-driving, and improve the comfort of the vehicle interior. Furthermore, the restriction of the operations of the devices makes it possible to reduce power consumption of the devices.

Furthermore, the in-vehicle control apparatus 1 controls the operation of the blinker 52 of the vehicle 100 and reduces the operation sound of the blinker 52. Accordingly, it is possible to reduce the operation sound of the blinker 52 that is not necessary during self-driving, and prevent a case in which the operation sound of the blinker 52 annoys the occupants in the vehicle interior, interferes with a conversation between the occupants, or the like, and to improve the comfort of the vehicle interior.

Furthermore, the in-vehicle control apparatus 1 controls the operation of the wiper 54 of the vehicle 100 and stops the automatic operation of the wiper 54 according to rainfall, that is, a so-called automatic wiper function. Accordingly, it is possible to stop the operation of the wiper 54 that is unnecessary during self-driving, prevent the operation of the wiper 54 from coming into the occupants' field of view, prevent a case in which the operation sound of the wiper 54 annoys the occupants, or the like, and to improve the comfort of the vehicle interior.

Furthermore, the in-vehicle control apparatus 1 controls the operation of the display device 57 of the vehicle 100 to reduce the brightness of the screen display of the display device 57 (including control for turning off the screen display). During self-driving, the occupants may not need the screen display of the display device 57 that displays information necessary for driving, and such screen display may bother the occupants. In view of this, by the in-vehicle control apparatus 1 reducing the brightness of the screen display of the display device, the comfort of the vehicle interior during self-driving can be improved.

Furthermore, the in-vehicle control apparatus 1 controls the operation of the car navigation device 56 of the vehicle 100 to reduce the volume of the guidance voice of the car navigation device 56 (including control for turning off the guidance voice). Since the guidance by the car navigation device 56 is not necessary during self-driving, such guidance voice may bother the occupants. In view of this, by the in-vehicle control apparatus 1 reducing the volume of the guidance voice of the car navigation device 56, the comfort of the vehicle interior during self-driving can be improved.

Note that, although the control targets and the control contents of the in-vehicle control apparatus are shown in FIG. 3 in the present embodiment, this is an example and the control targets of the in-vehicle control apparatus 1 are not limited to that shown in FIG. 3, and the control contents are also not limited to that shown in FIG. 3. Any device mounted in the vehicle 100 may be controlled by the in-vehicle control apparatus 1. The control targets of the in-vehicle control apparatus 1 are favorably the devices that are necessary when the driver manually drives the vehicle 100 and that are not necessary when the vehicle 100 is self-driving. Also, any control content may be performed on the devices by the in-vehicle control apparatus 1. The control content performed on the devices by the in-vehicle control apparatus 1 is favorably a control for stopping some of the functions of the devices when self-driving of the vehicle 100 starts, and a control for stopping the devices when the driver's seat 101 is turned backward.

Furthermore, although the in-vehicle control apparatus 1 is configured to restrict the functions of the devices when the self-driving is started or the driver's seat 101 is turned backward, there is no limitation to this configuration. The in-vehicle control apparatus 1 may also release the functions of devices when self-driving is started or when the driver's seat 101 is turned backward, in other words, the functions of devices that are not operated at the time of manual driving may be operated at the time of self-driving. Furthermore, a configuration may also be adopted in which the user can set, for each device, whether the in-vehicle control apparatus 1 applies the restriction to the device.

In the present embodiment, the driver's seat 101 changes direction in two directions, namely, forward and backward, however there is no limitation to this configuration. For example, a configuration may also be used in which the driver's seat 101 can rotate and change direction in 360°. The in-vehicle control apparatus 1 can perform control with the state where the angle of the driver's seat 101 is 90° to 270° regarded as "backward-facing" as in the above-mentioned embodiment, for example, assuming that a state where the driver's seat 101 faces forward is a reference of 0°, and the rotation angle of the driver's seat 101 is expressed by 0° to 360° clockwise. "Backward-facing" is not limited to the angle range of 90° to 270°, and may be 100° to 260°, 160° to 200°, or only 180°, for example.

Furthermore, in the present embodiment, the in-vehicle control apparatus 1 controls the devices based on the two conditions, namely, whether the vehicle 100 is self-driving, and whether the driver's seat 101 faces backward, however there is no limitation to this configuration. The in-vehicle control apparatus 1 may be configured to perform control of the devices based on any one of the conditions, namely, whether the vehicle 100 is self-driving, and whether the driver's seat 101 faces backward. The configuration of the in-vehicle control apparatus 1 described above will be shown in a first modification and a second modification.

First Modification

An in-vehicle control apparatus 1 according to the first modification is configured to perform control of a device in accordance with the direction of the driver's seat 101 of the vehicle 100. When the driver's seat 101 faces forward, the in-vehicle control apparatus 1 according to the first modification operates the devices of the vehicle 100 in the non-restriction mode even if the vehicle 100 is self-driving. When the driver's seat 101 faces backward, the in-vehicle control apparatus 1 operates the devices of the vehicle 100 in the restriction mode. Note that the restriction mode according to the first modification may be the same control content as the second restriction mode shown in FIG. 3.

Figure 5:
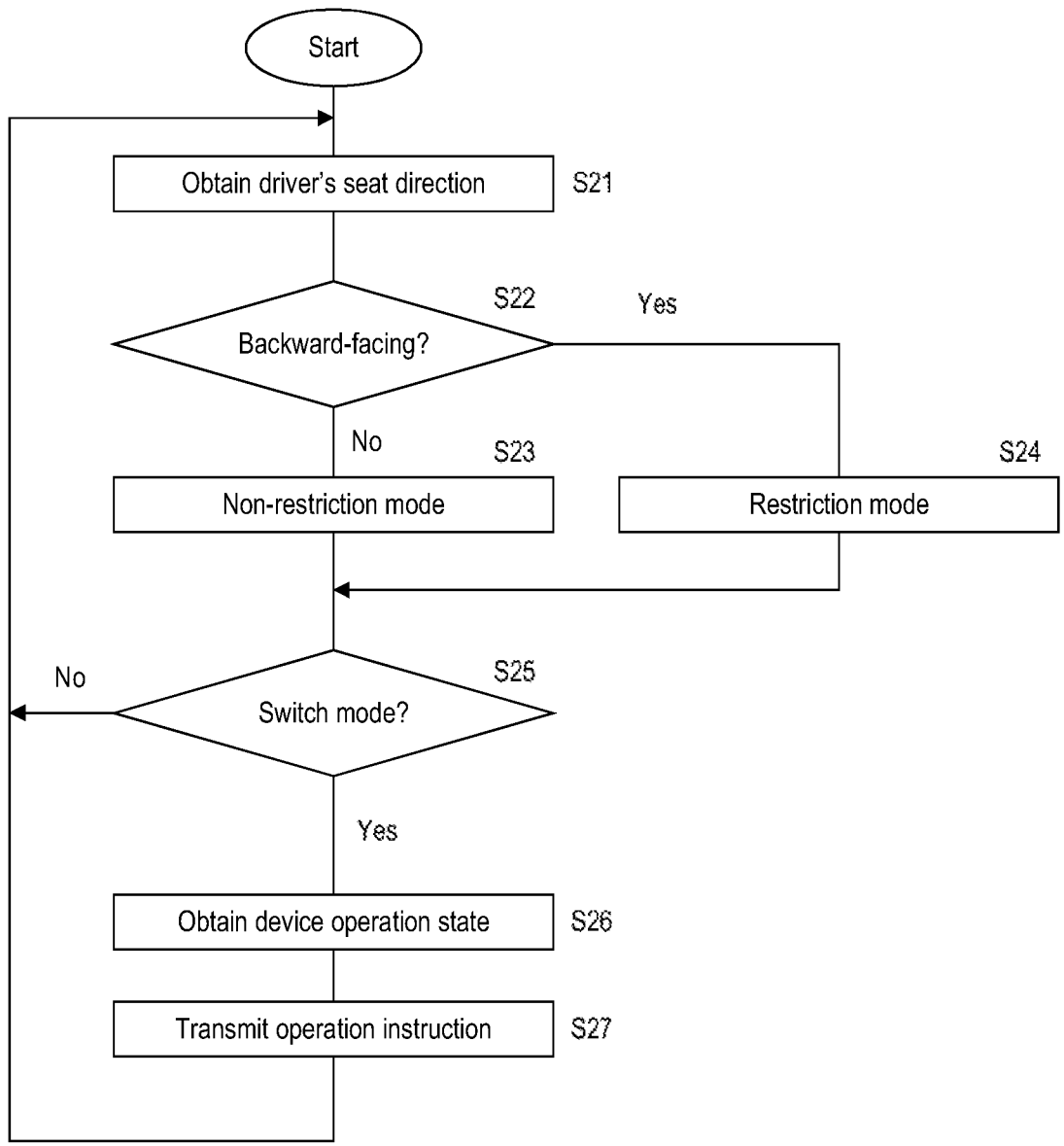
FIG. 5 is a flowchart illustrating procedures of operation restriction processing performed by an in-vehicle control apparatus according to a first modification.

FIG. 5 is a flowchart illustrating the procedures of the operation restriction processing performed by the in-vehicle control apparatus 1 according to the first modification. The seat information obtaining unit 21 of the processing unit 10 of the in-vehicle control apparatus 1 according to the first modification obtains the direction of the driver's seat 101 of the vehicle 100 by obtaining information input from the seat sensor 61 with the input/output unit 13 (step S21). The seat information obtaining unit 21 determines whether the driver's seat 101 faces backward based on the obtained information (step S22). If the driver's seat 101 does not face backward (S22: NO), the device operation control unit 24 of the processing unit 10 determines to operate various kinds of devices mounted in the vehicle 100 in the non-restriction mode (step S23), and advances the processing to step S25. If the driver's seat 101 faces backward (S22: YES), the device operation control unit 24 determines to operate the various kinds of devices mounted in the vehicle 100 in the restriction mode (step S24), and advances the processing to step S25.

Upon determining the mode regarding the control of the devices, the device operation control unit 24 determines whether the mode needs to be switched based on whether the mode that has been determined this time is different from the previous mode (step S25). If the mode does not need to be switched (S25: NO), the processing unit 10 returns the processing to step S21. If the mode needs to be switched (S25: YES), the device operation state obtaining unit 23 of the processing unit 10 performs communication with the devices to be controlled through the in-vehicle communication unit 12 and obtains the operation state of the devices (step S26). The device operation control unit 24 transmits the operation instructions to the devices to change the operations of the devices to that appropriate in the determined mode, based on the obtained operation state (step S27) and returns the processing to step S21.

The in-vehicle control apparatus 1 according to the first modification configured as above obtains the direction of the driver's seat 101 of the vehicle 100, and controls the operations of the devices mounted in the vehicle 100 in accordance with the direction of the driver's seat 101. If the driver's seat 101 faces backward, the driver cannot drive the car, and thus it can be inferred that the vehicle 100 is self-driving. The in-vehicle control apparatus 1 according to the first modification can infer whether the vehicle 100 is self-driving based on the direction of the driver's seat 101 of the vehicle 100, and thus it is possible to operate the devices giving priority to improvement of the comfort of the vehicle interior during self-driving.

Second Modification

An in-vehicle control apparatus 1 according to a second modification is configured to perform control of the devices based on whether the vehicle 100 is self-driving. When the vehicle 100 is self-driving, the in-vehicle control apparatus 1 according to the second modification operates the devices of the vehicle 100 in the restriction mode regardless of the direction of the driver's seat 101. When the vehicle 100 is not self-driving, the in-vehicle control apparatus 1 operates the devices of the vehicle 100 in the non-restriction mode. Note that the restriction mode according to the second modification may be the same control content as the second restriction mode shown in FIG. 3.

Figure 6:
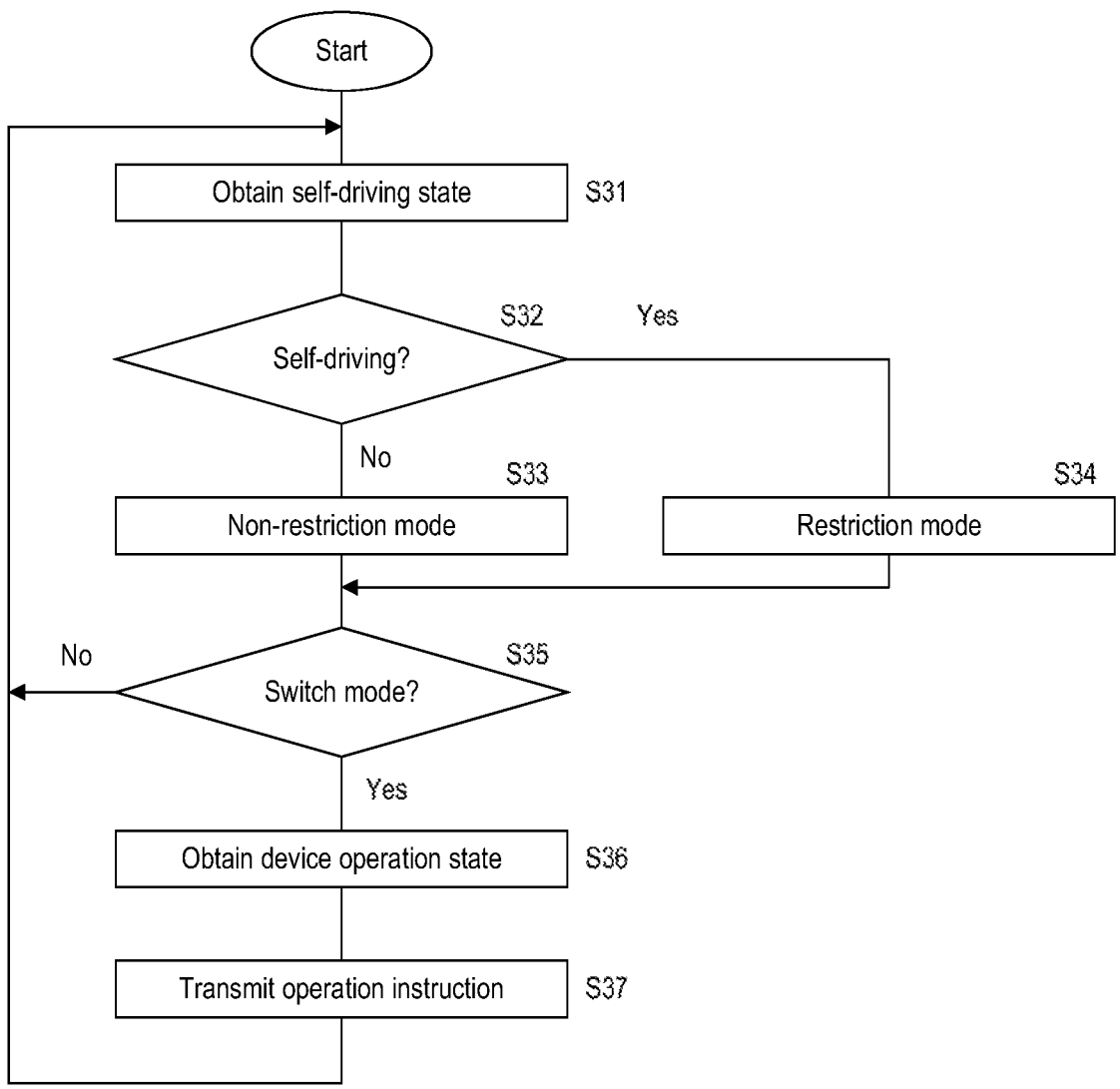
FIG. 6 is a flowchart illustrating procedures of operation restriction processing performed by an in-vehicle control apparatus according to a second modification.

FIG. 6 is a flowchart illustrating the procedures of the operation restriction processing performed by the in-vehicle control apparatus 1 according to the second modification. The self-driving state obtaining unit 22 of the processing unit 10 of the in-vehicle control apparatus 1 according to the second modification obtains information regarding the self-driving state of the vehicle 100 by performing communication with the self-driving system 51 via the in-vehicle network 50 through the in-vehicle communication unit 12 (step S31). The self-driving state obtaining unit 22 determines whether the vehicle 100 is in a state of self-driving based on the obtained self-driving state (step S32). If self-driving is not being performed (S32: NO), the device operation control unit 24 of the processing unit 10 determines to operate various kinds of devices mounted in the vehicle 100 in the non-restriction mode (step S33), and advances the processing to step S35. If self-driving is being performed (S32: YES), the device operation control unit 24 determines to operate the devices mounted in the vehicle 100 in the restriction mode (step S34), and advances the processing to the step S35.

Upon determining the mode regarding the control of the devices, the device operation control unit 24 determines whether the mode needs to be switched based on whether the mode determined this time is different from the previous mode (step S35). If the mode does not need to be switched (S35: NO), the processing unit 10 returns the processing to step S31. If the mode needs to be switched (S35: YES), the device operation state obtaining unit 23 of the processing unit 10 performs communication with the devices to be controlled through the in-vehicle communication unit 12, and obtains the operation states of the devices (step S36). The device operation control unit 24 transmits the operation instructions to the devices to change the operations of the devices to that appropriate in the determined mode, based on the obtained operation states (step S37), and returns the processing to step S31.

The in-vehicle control apparatus 1 according to the second modification configured above obtains the self-driving state and determines whether the vehicle 100 is self-driving, and controls the operations of the devices mounted in the vehicle 100 in accordance with the determination result. Accordingly, the in-vehicle control apparatus 1 can restrict the operations of the devices that are not needed by the driver during self-driving, and the comfort of the vehicle interior can be improved.

The embodiments disclosed herein are illustrative in all aspects, and should be considered as non-limiting. The scope of the present disclosure is not defined by the above description, but by the claims, and all changes within the meaning and range of equivalency of the claims are intended to be embraced therein.

The invention claimed is:

1. An in-vehicle control apparatus that is to be mounted in a vehicle having a self-driving function and a driver's seat that can be turned backward, the in-vehicle control apparatus comprising:
   a seat sensor configured to determine a direction of the driver's seat; and
   a control unit configured to control an operation of a device mounted in the vehicle, and
   wherein the device emits an operation sound when operating, and
   when the direction of the driver's seat determined by the seat sensor is backward, the control unit performs control for reducing the operation sound of the device.

2. The in-vehicle control apparatus according to claim 1, further comprising:
   a self-driving determination unit configured to process a vehicle information to determine whether the vehicle is self-driving,
   wherein the control unit controls the operation of the device in accordance with a determination result of the self-driving determination unit, and the direction determined by the seat sensor.

3. The in-vehicle control apparatus according to claim 2, wherein the control unit operates the device in a first operation state when the self-driving determination unit determines that the vehicle is self-driving and the direction determined by the seat sensor is forward, and the control unit operates the device in a second operation state when the self-driving determination unit determines that the vehicle is self-driving and the direction determined by the seat sensor is backward.

4. The in-vehicle control apparatus according to claim 1, wherein the device is a wiper, the wiper configured to perform an automatic operation according to rainfall, and the control unit performs control for stopping the automatic operation of the wiper when the vehicle is self-driving and the direction determined by the seat sensor is backward so as to reduce the operation sound of the wiper.

5. The in-vehicle control apparatus according to claim 1, wherein the device is a car navigation device, and the control unit performs control for reducing a volume of a guidance voice of the car navigation device so as to reduce the operation sound of the car navigation device.

6. The in-vehicle control apparatus according to claim 2, wherein the device is a wiper that performs an automatic operation according to rainfall, and the control unit performs control for stopping the automatic operation of the wiper that is performed according to rainfall.

7. The in-vehicle control apparatus according to claim 3, wherein the device is a wiper that performs an automatic operation according to rainfall, and the control unit performs control for stopping the automatic operation of the wiper in the second operation so as to reduce the operation sound of the wiper.

8. The in-vehicle control apparatus according to claim 2, wherein the device is a car navigation device, and the control unit performs control for reducing a volume of a guidance voice of the car navigation device.

9. The in-vehicle control apparatus according to claim 3, wherein the device is a car navigation device, and the control unit performs control for reducing a volume of a guidance voice of the car navigation device in the second operation.

10. The in-vehicle control apparatus according to claim 4, wherein the device further includes a car navigation device, and the control unit performs control for reducing a volume of a guidance voice of the car navigation device so as to reduce the operation sound of the car navigation device.

11. The in-vehicle control apparatus according to claim 1, wherein the device is a blinker, the blinker emitting the operation sound.

12. A device control method in a vehicle configured to drive in a self-driving mode and a driver's seat that can be turned backward, the method comprising:
a device for executing a vehicle function, the device emitting an operation sound;
determining a direction of the driver's seat;
determining if the vehicle is operating in a self-driving mode; and
reducing the operation sound of the device when the direction of the driver's seat is backward and the vehicle is operating in a self-driving mode.

13. A device control method in a vehicle configured to drive in a self-driving mode and a driver's seat that can be turned backward, the method comprising:
a display screen mounted within a cabin of the vehicle;
determining if the vehicle is operating in a self-driving mode;
determining a direction of the driver's seat; and
reducing a brightness of the display screen when the direction of the driver's seat is backward and the vehicle is operating in a self-driving mode.

* * * * *